(12) United States Patent
Wu

(10) Patent No.: US 9,372,621 B2
(45) Date of Patent: Jun. 21, 2016

(54) OPERATING METHOD OF ELECTRONIC DEVICE

(71) Applicant: ASUSTeK COMPUTER INC., Taipei (TW)

(72) Inventor: I-Hsi Wu, Taipei (TW)

(73) Assignee: ASUSTeK COMPUTER INC., Taipei (TW)

(*) Notice: Subject to any disclaimer, the term of this patent is extended or adjusted under 35 U.S.C. 154(b) by 204 days.

(21) Appl. No.: 14/014,379

(22) Filed: Aug. 30, 2013

(65) Prior Publication Data

US 2014/0078082 A1 Mar. 20, 2014

Related U.S. Application Data

(60) Provisional application No. 61/702,261, filed on Sep. 18, 2012.

(30) Foreign Application Priority Data

Jun. 18, 2013 (TW) .............................. 102121641 A

(51) Int. Cl.
*G06F 3/0488* (2013.01)
*G06F 3/0484* (2013.01)

(52) U.S. Cl.
CPC .......... *G06F 3/04883* (2013.01); *G06F 3/0484* (2013.01); *G06F 2203/04808* (2013.01)

(58) Field of Classification Search
CPC .......... G06F 2203/04808; G06F 3/017; G06F 3/041; G06F 3/0416; G06F 3/0484; G06F 3/04883

USPC .......... 345/173–179; 715/769, 862–863, 781, 715/790, 815; 455/566
See application file for complete search history.

(56) References Cited

U.S. PATENT DOCUMENTS

| 8,896,621 | B1* | 11/2014 | Sipher et al. | 345/619 |
|---|---|---|---|---|
| 2006/0008779 | A1* | 1/2006 | Shand et al. | 434/90 |
| 2009/0237413 | A1 | 9/2009 | Ogawa et al. | |
| 2009/0267908 | A1 | 10/2009 | Wu et al. | |
| 2010/0056128 | A1* | 3/2010 | Hwang et al. | 455/418 |
| 2010/0073303 | A1 | 3/2010 | Wu et al. | |
| 2010/0149109 | A1 | 6/2010 | Elias | |
| 2010/0251154 | A1 | 9/2010 | Chang et al. | |

(Continued)

FOREIGN PATENT DOCUMENTS

| CN | 102576268 A | 7/2012 |
|---|---|---|
| TW | 200945138 A | 11/2009 |

(Continued)

*Primary Examiner* — Amare Mengistu
*Assistant Examiner* — Stacy Khoo
(74) *Attorney, Agent, or Firm* — CKC & Partners Co., Ltd.

(57) ABSTRACT

An operating method of an electronic device is provided. The electronic device includes a display module and a detecting module. The operating method includes: detecting a first input signal by the detecting module; triggering an auxiliary displaying module according to the first input signal, and displaying the auxiliary displaying module on the display module; detecting a second input signal by the detecting module; determining whether the second input signal is in a sensing zone corresponding to the auxiliary displaying module; and displaying a drawing track along an edge of the auxiliary displaying module according to the second input signal when the second input signal is in the sensing zone.

12 Claims, 9 Drawing Sheets

(56) References Cited

U.S. PATENT DOCUMENTS

| | | | |
|---|---|---|---|
| 2010/0295796 A1* | 11/2010 | Roberts et al. | 345/173 |
| 2011/0169748 A1* | 7/2011 | Tse et al. | 345/173 |
| 2011/0175821 A1* | 7/2011 | King | 345/173 |
| 2012/0052921 A1 | 3/2012 | Lim et al. | |
| 2012/0192110 A1 | 7/2012 | Wu | |
| 2012/0313865 A1 | 12/2012 | Pearce | |
| 2013/0016126 A1* | 1/2013 | Wang et al. | 345/650 |

FOREIGN PATENT DOCUMENTS

| | | |
|---|---|---|
| TW | 201013511 A | 4/2010 |
| TW | 201035829 A | 10/2010 |
| TW | I354223 | 12/2011 |
| TW | 201232354 A | 8/2012 |

* cited by examiner

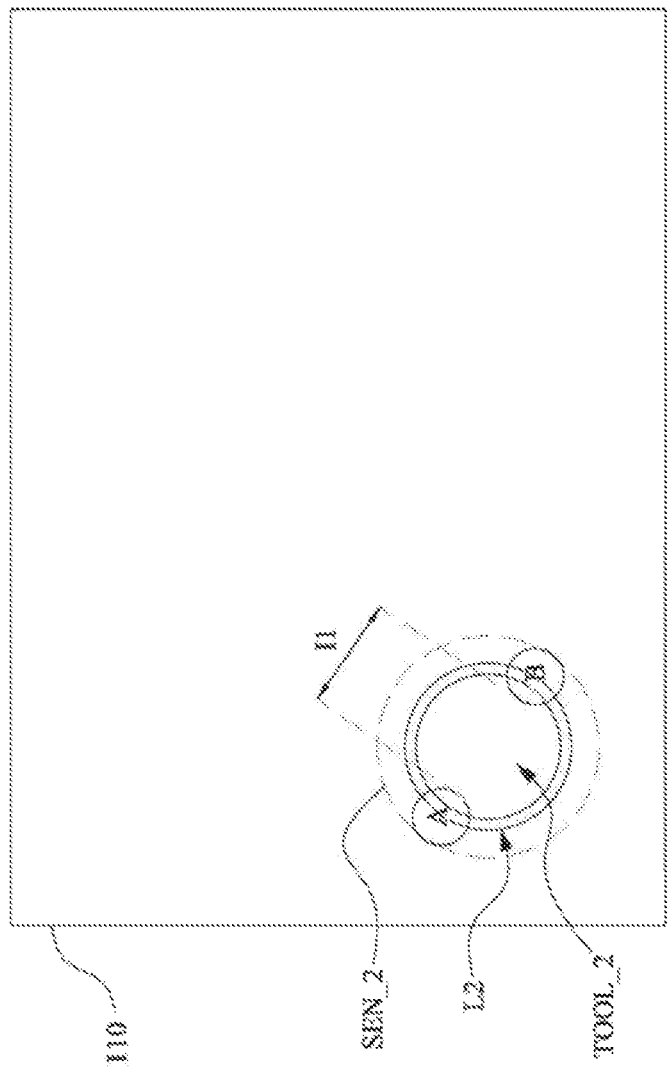

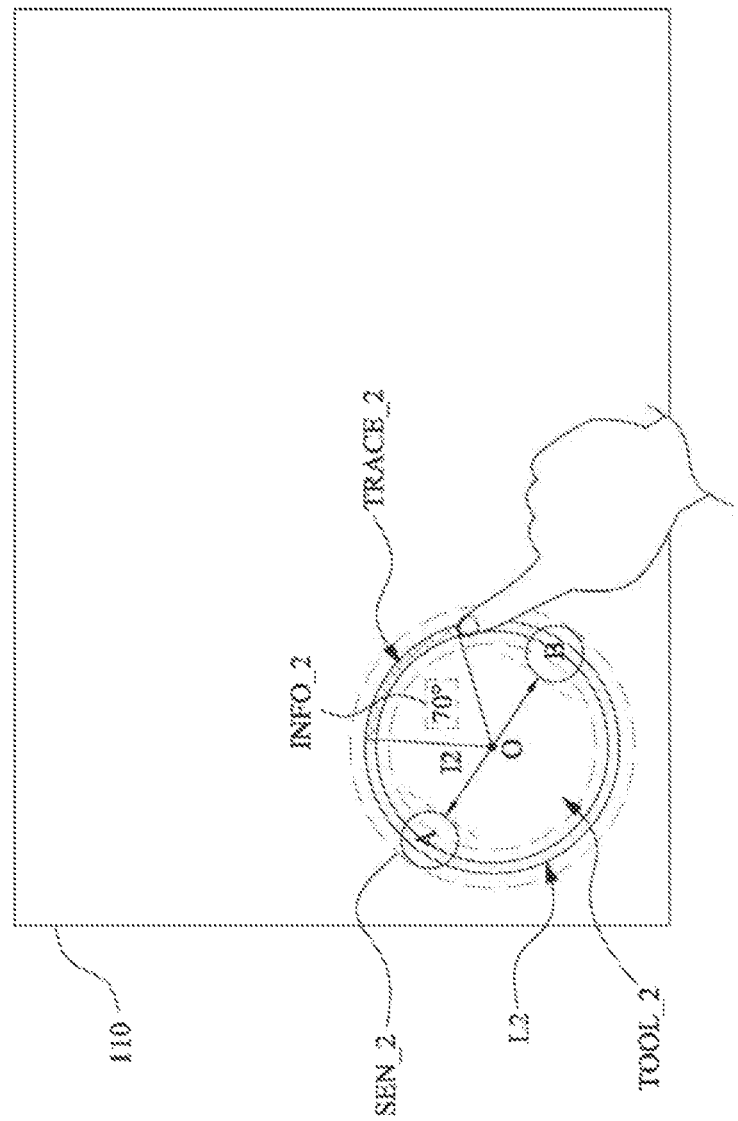

OPERATING METHOD OF ELECTRONIC DEVICE

CROSS-REFERENCE TO RELATED APPLICATION

This application claims the priority benefit of U.S. provisional application Ser. No. 61/702,261, filed on Sep. 18, 2012, and Taiwan application serial No. 102121641, filed on Jun. 18, 2013. The entirety of the above-mentioned patent application are hereby incorporated by reference herein and made a part of specification.

BACKGROUND OF THE INVENTION

1. Field of the Invention

The invention relates to an operating method applied to an electronic device and, more particularly, to an operating method applied to an electronic device with a display module.

2. Description of the Related Art

Along with the improvement of the electronic technology, electronic devices are widely used in daily life, such as smart phones, tablet computers, electronic books.

The electronic device, such as a smart phone, a tablet computer, an electronic book, has a display module (such as a touch panel). The display module may include a touch sensing component and an electromagnetic sensing component. The touch sensing component and the electromagnetic sensing component may respectively sense a touch input and the change of a magnetic field due to an approach of an electromagnetic pen. A user may input an instruction (such as a click or a slide) to the electronic device via the display module, and then, the user may operate the electronic device according to a visual feedback of the display module.

BRIEF SUMMARY OF THE INVENTION

An operating method is provided. The operating method may be applied to an electronic device in an embodiment. The electronic device includes a display module and a detecting module. The operating method includes: detecting a first input signal by the detecting module; triggering an auxiliary displaying module according to the first input signal, and displaying the auxiliary displaying module on the display module; detecting a second input signal by the detecting module; determining whether the second input signal is in a sensing zone corresponding to the auxiliary displaying module; and displaying a drawing track along an edge of the auxiliary displaying module according to the second input signal when the second input signal is in the sensing zone.

These and other features, aspects and advantages of the present invention will become better understood with regard to the following description, appended claims, and accompanying drawings.

BRIEF DESCRIPTION OF THE DRAWINGS

FIG. 4A and FIG. 4B are schematic diagrams of operations of the operating method in FIG. 2 in another embodiment;

DETAILED DESCRIPTION OF THE EMBODIMENTS

In an embodiment of the invention, an electronic device is a tablet computer as an example, which is not limited herein.

Figure 1:
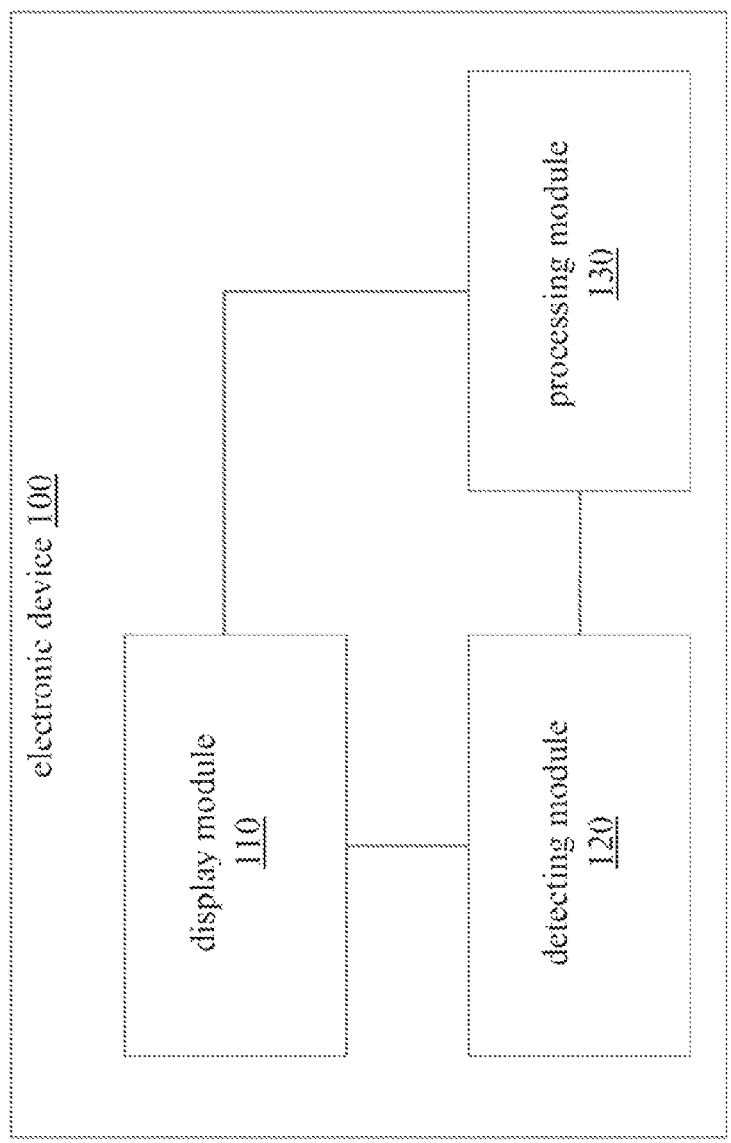
FIG. 1 is a schematic diagram of an electronic device in a first embodiment.

FIG. 1 is a schematic diagram of an electronic device 100 in a first embodiment. The electronic device 100 includes a display module 110, a detecting module 120, and a processing module 130. The display module 110, the detecting module 120, and the processing module 130 are electrically connected with each other.

In the embodiment, the display module 110 is a touch panel with a function of electromagnetic induction. The display module 110 may sense a touch input, and it may sense the change of a magnetic field when an electromagnetic pen or other appropriate object approaches or touches, and it outputs a sensing signal accordingly. In the embodiment, a user operates the display module 110 by touching the display module 110, which is not limited herein. The display module 110 may receive a control signal of the processing module 130 and display an image.

The detecting module 120 may receive a sensing signal of the display module 110 to detect an input of the user (such as a single point click or a multipoint click, a single point or a multipoint slide) and provide a detecting signal. The detecting module 120 may be a central processing unit, a micro processer, or other appropriate component with processing function.

The processing module 130 may be used to receive the detecting signal of the detecting module 120, and it provides a control signal to the display module 110 to control a display image of the display module 110. The processing module 130 may be a central processing unit, a micro processer, or other appropriate component with processing function.

An operating method is provided in the embodiment. The operating method may be applied to the electronic device 100 in FIG. 1 or other similar electronic devices. For a concise purpose, in the following embodiment, the electronic device 100 in FIG. 1 is taken as an example to describe the operating method in the first embodiment, which is not limited herein.

Figure 2:
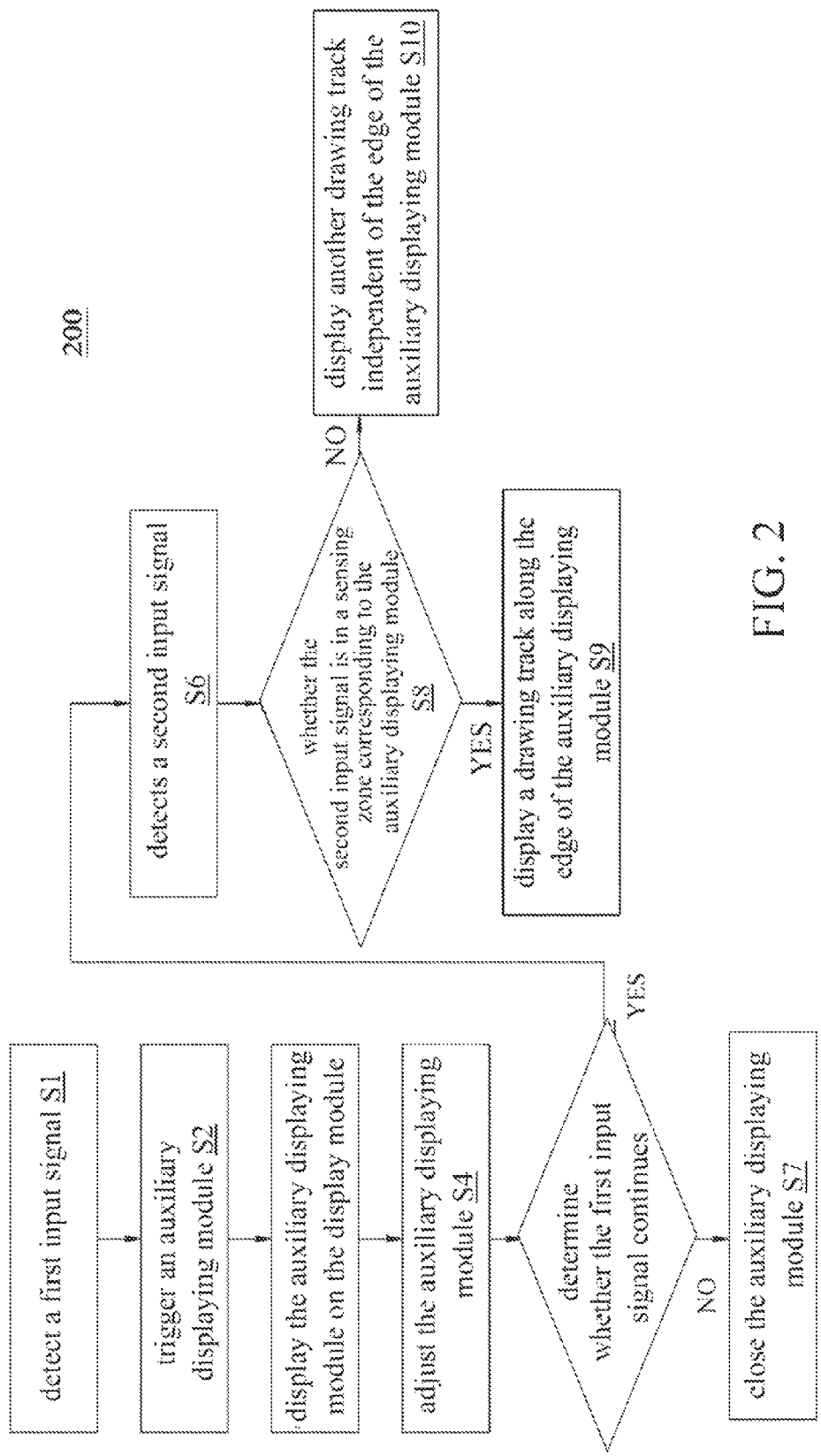
FIG. 2 is a flow chart of an operating method in a first embodiment.

Please refer to FIG. 2, FIG. 3, FIG. 4A, and FIG. 4B. FIG. 2 is a flow chart of an operating method 200 in the first embodiment. The operating method 200 includes following steps.

In step S1, the detecting module 120 detects a first input signal via the display module 110. In the embodiment, the first input signal may be a control operation of a user to control the display module 110, such as a single point or multipoint click (the user clicks the display module 110 by one or two fingers).

In step S2, the processing module 130 may determine whether the first input signal is a predefined operation for triggering an auxiliary displaying module, and it triggers the auxiliary displaying module according to the first input signal. The auxiliary displaying module may be a virtual ruler TOOL_1 in FIG. 3 or a virtual protractor TOOL_2 in FIG. 4A, 4B.

In step S3, the processing module 130 may control the display module 110 to display the auxiliary displaying module and an auxiliary line of the auxiliary displaying module (such as the auxiliary line L1 of the virtual ruler virtual ruler TOOL_1 and the auxiliary line L2 of the virtual protractor TOOL_2). The auxiliary line may be at an edge of the auxiliary displaying module (for example, the auxiliary line L1 is at the edge of the virtual ruler TOOL_1, and the auxiliary line L2 is at the edge of the virtual protractor TOOL_2).

In step S4, the detecting module 120 may detect the displacement of the first input signal via the display module 110, and the processing module 130 may control the display module 110 to adjust a display size, a display angle, and/or a display position of the auxiliary displaying module and the auxiliary line displayed on the display module according to the displacement of the first input signal,.

In step S5, the processing module 130 may determine whether the first input signal continues via the detecting module 120. For example, the processing module 130 determines whether the user continues a single point click or a multipoint click on the display module 110. If yes, go to step S6; if no go to step S7.

In step S6, if the first input signal lasts, the detecting module 120 detects a second input signal via the display module 110. The second input signal may be a control operation on the display module 110, such as a single point click, a single point slide, a multipoint click, or a multipoint slide.

In step S7, if the first input signal stops, the processing module 130 may close the auxiliary displaying module (such as the virtual ruler TOOL_1 or the virtual protractor TOOL_2), and the processing module 130 controls the display module 110 to stop displaying the auxiliary displaying module and the auxiliary line of the auxiliary displaying module. In other words, the processing module 130 may selectively close the auxiliary displaying module according to whether the first input signal stops. In some embodiments, when the first input signal stops, the processing module 130 closes the auxiliary displaying module instantly. However, the auxiliary displaying module is not limited to be closed in a specific step.

In step S8, when the second input signal is detected, the processing module 130 may determine whether the second input signal is in a sensing zone corresponding to the auxiliary displaying module (such as the sensing zone SEN_1 corresponding to the virtual ruler TOOL_1 and the sensing zone SEN_2 corresponding to the virtual protractor TOOL_2). If yes, go to step S9; if no, go to step S10. The sensing zone of the auxiliary displaying module may be around the auxiliary line (for example, the sensing zone SEN _1 of the virtual ruler TOOL_1 is around the auxiliary line L1, and the sensing zone SEN_2 of the virtual protractor TOOL_2 is around the auxiliary line L2).

In step S9, if the second input signal is in the sensing zone of the auxiliary displaying module, the processing module 130 may control the display module 110 to display a drawing track along the edge of the auxiliary displaying module (or along the auxiliary line of the auxiliary displaying module) according to the second input signal, for example, it displays the drawing track TRACE_1 along the edge of the virtual ruler TOOL_1 or along the auxiliary line L1)), or displays the drawing track TRACE_2 along the edge of the virtual protractor TOOL_2 (or along the auxiliary line L2).

In step S10, if the second input signal is not in the sensing zone, the processing module 130 may control the display module 110 to display another drawing track independent of the edge of the auxiliary displaying module according to the second input signal (in other words, the drawing track is not displayed along the edge of the auxiliary displaying module).

The virtual auxiliary displaying module can be realized by applying the embodiment aforementioned. Furthermore, it may close to the user experience of drawing with an actual tool by applying the auxiliary displaying module in the embodiment, and it makes the user draw on the electronic device easier.

Furthermore, according to an embodiment, the processing module 130 may calculate an auxiliary information of the drawing track instantly or non-instantly according to the drawing track (such as the auxiliary information INFO_1 of the drawing track TRACE_1 (such as a length of the drawing track TRACE_1) or the auxiliary information INFO_2 of the drawing track TRACE_2 (such as an angle of the drawing track TRACE_2 corresponding to a central O of the virtual protractor TOOL_2)), and the processing module 130 may control the display module 110 to display the auxiliary information instantly or non-instantly.

Therefore, the user may quickly get information of the drawing track when he or she draws with the auxiliary displaying module, which may significantly increase the convenience of using the auxiliary displaying module.

More details are described in following paragraphs, which are not for limiting the scope.

According to an embodiment, in step S2, the processing module 130 may determine the number of sensing points of the first input signal (such as the number of fingers touching the display module 110), and the processing module 130 determines the type of the auxiliary displaying module to be triggered according to the number of the sensing points (for example, it determines to trigger the virtual ruler TOOL_1 or the virtual protractor TOOL_2).

In step S3, the processing module 130 determines a display position, a display size, or the display angle of the auxiliary displaying module and the auxiliary line displaying on the display module according to sensing positions of the sensing points of the first input signal on the display module 110.

Figure 3:
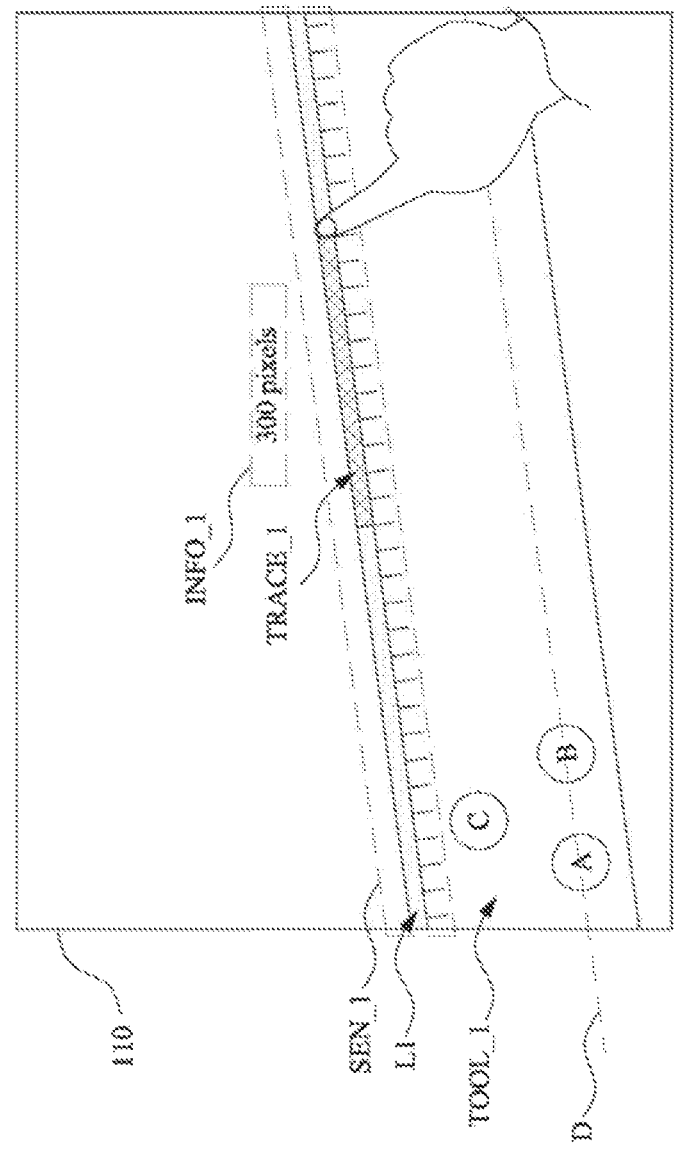
FIG. 3 is a schematic diagram of operations of the operating method in FIG. 2 in an embodiment.

For example, specially referring to FIG. 3, when the auxiliary displaying module is the virtual ruler TOOL_1, the processing module 130 may determine the display positions of the virtual ruler TOOL_1 and the auxiliary line L1 displaying on the display module 110 according to the sensing positions of total or parts of the sensing points A, B, C of the first input signal on the display module 110. Furthermore, the processing module 130 may determine the display angle of the virtual ruler TOOL_1 and the auxiliary line L1 displaying on the display module 110 according to a line D formed by the sensing positions of at least two of the sensing points A, B, C (such as the sensing points A, B). In an embodiment, the line D and the auxiliary line L1 have the same slope.

For example, referring to FIG. 4A, when the auxiliary displaying module is the virtual protractor TOOL_2, the processing module 130 may determine the display positions of the virtual ruler TOOL_2 and the auxiliary line L2 displaying on the display module 110 according to total or parts of the sensing positions of the sensing points A, B. Furthermore, the processing module 130 may determine the display size of the virtual protractor TOOL_2 and the auxiliary line L2 displaying on the display module 110 according to a distance l1 between the sensing positions of the sensing points A, B.

In step S4, when the auxiliary displaying module is the virtual ruler TOOL_1 (referring to FIG. 3), the processing module 130 may determine an adjusted positions of the virtual ruler TOOL_1 and the auxiliary line L1 displaying on the display module 110 according to the sensing positions of total or parts of moved sensing points A, B, C of the first input signal. Furthermore, the processing module 130 may determine an adjusted display angle of the virtual ruler TOOL_1 and the auxiliary line L1 displaying on the display module

110 according to the line D formed by the sensing positions of at least two moved sensing points A, B, C (such as the moved sensing points A, B).

Similarly, when the auxiliary displaying module is the virtual protractor TOOL_2 (please refer to FIG. 4A, 4B), the processing module 130 may adjust the display positions of the virtual protractor TOOL_2 and the auxiliary line L2 displaying on the display module 110 according to the sensing positions of the sensing points A, B after the first input signal moves on the display module 110. Furthermore, the processing module 130 may adjust the display size of the virtual protractor TOOL_2 and that of the auxiliary line L2 displayed on the display module 110 according to a distance I2 of the moved sensing points A, B.

According to an embodiment, in step S8, if the second input signal is a single point click, the processing module 130 may determine whether the sensing position of the sensing point (such as a touch point of a finger touching the display module 110) is in the sensing zone. According to another embodiment, in step S7, when the second input signal is a single point slide, the processing module 130 may determine whether the sensing position of a start point of the slide (such as the start point of the finger touching the display module 110) is in the sensing, zone.

The operating method is further illustrated in the following embodiments, which is not for limiting the scope.

Please refer to FIG. 3. In a first operating state, for example, the user touches the display module 110 by three fingers. The processing module 130 determines to trigger the virtual ruler TOOL_1 according to the number of the sensing points (such as 3). Then, the processing module 130 controls the display module 110 to display the virtual ruler TOOL_1 and the auxiliary line L1 of the virtual ruler TOOL_1 according to the sensing positions of the three fingers touching the display module 110 (that are the sensing points A, B, C). Then, if the sensing positions of the sensing points A, B, C move, the processing module 130 detects the displacement and the sensing positions of the moved sensing points A, B, C via the detecting module 120. Then, the processing module 130 controls the display module 110 to adjust the display positions of the virtual ruler TOOL_1 and the auxiliary line L1 according to the moved sensing points A, B, C. Then, if the user continuously touches the display module 110 by three fingers, the detecting module 120 detects the second input signal via the display module 110. If the user stops touching the display module 110 by three fingers, the processing module 130 closes the virtual ruler TOOL_1 and controls the display module 110 stops displaying the virtual ruler TOOL_1 and the auxiliary line L1.

When the user continuously touches the display module 110 by three fingers, the user may generate a single point slide (it also may be a multipoint click, a single point slide or a multipoint slide and so on) at the edge of the virtual ruler TOOL_1 (or in the sensing zone SEN_1). Then, the processing module 130 determines that the single point slide is in the sensing zone SEN_1 and controls the display module 110 to display the drawing track TRACE_1 along the edge of the virtual ruler TOOL_1 (or along the auxiliary line L1) according to the single point slide. Furthermore, the processing module 130 also calculates the auxiliary information (length) INFO_1 of the drawing track TRACE_1 and controls the display module 110 to synchronously display the drawing track TRACE_1 and the auxiliary information INFO_1. On the other hand, if a single point slide (it also may be a multipoint click, a single point, or a multipoint slide) is not at the edge of the virtual ruler TOOL_1 (or in the sensing zone SEN_1), the processing module 130 controls the display module 110 to display another drawing track independent of the auxiliary line L1 (such as a path of the single point slide) according to the single point slide.

On the other hand, please refer to FIG. 4A, 4B. In a second operation mode, the user touches the display module 110 by two fingers. The processing module 130 determines to trigger the virtual protractor TOOL_2 according to the number of the sensing points (such as 2). Then, according to the sensing positions of the two fingers touching the display module 110 (the sensing points A, B) and a distance I1 between the sensing positions of the sensing points A, B, the processing module 130 determines the display position and the display size of the virtual protractor TOOL_2 and these of the auxiliary line L2 of the virtual protractor TOOL_2 and controls the display module 110 to display the virtual protractor TOOL_2 and the auxiliary line L2 of the virtual protractor TOOL_2. Then, if the sensing positions of the sensing points A, B move, the processing module 130 detects the displacement of the sensing position of the sensing points A, B and the sensing positions of the moved sensing points A, B via the detecting module 120. The processing module 130 controls the display module 110 to adjust the display position of the virtual protractor TOOL_2 and the auxiliary line L2 according to the moved sensing positions of the sensing points A, B and the distance I2 between the sensing positions of the sensing points A, B. If the user continuously touches the display module 110 by two fingers, the detecting module 120 detects the second input signal via the display module 110. If the user stops touching the display module 110 by two fingers, the processing module 130 closes the virtual protractor TOOL_2 and controls the display module 110 to stop displaying the virtual protractor TOOL_2 and the auxiliary line L2.

When the user continuously touches the display module 110 by two fingers, the user may generate a single point slide (which also may a multipoint click, a single point, or a multipoint slide) at the edge of the virtual protractor TOOL_2 (or in the sensing zone SEN_2). The processing module 130 determines that the single point slide is in the sensing zone SEN_2, and the processing module 130 controls the display module 110 to display the drawing track TRACE_2 along the edge of the virtual protractor TOOL_2 (or along the auxiliary line L2) according to the single point slide. Furthermore, the processing module 130 also calculates the auxiliary information (such as the angle) INFO_2 of the drawing track TRACE_2 and controls the display module 110 to synchronously display the drawing track TRACE_2 and the auxiliary information INFO_2. On the other hand, if the single point slide (a multipoint click, a single point, or a multipoint slide) is not at the edge of the virtual protractor TOOL_2 (or in the sensing zone SEN_2) the processing module 130 controls the display module 110 to display another drawing track independent of the auxiliary line L1 (such as a path of the single point slide) according to the single point slide.

Other embodiments of the operating method are provided in following paragraphs, which are not for limiting the scope.

Figure 5:
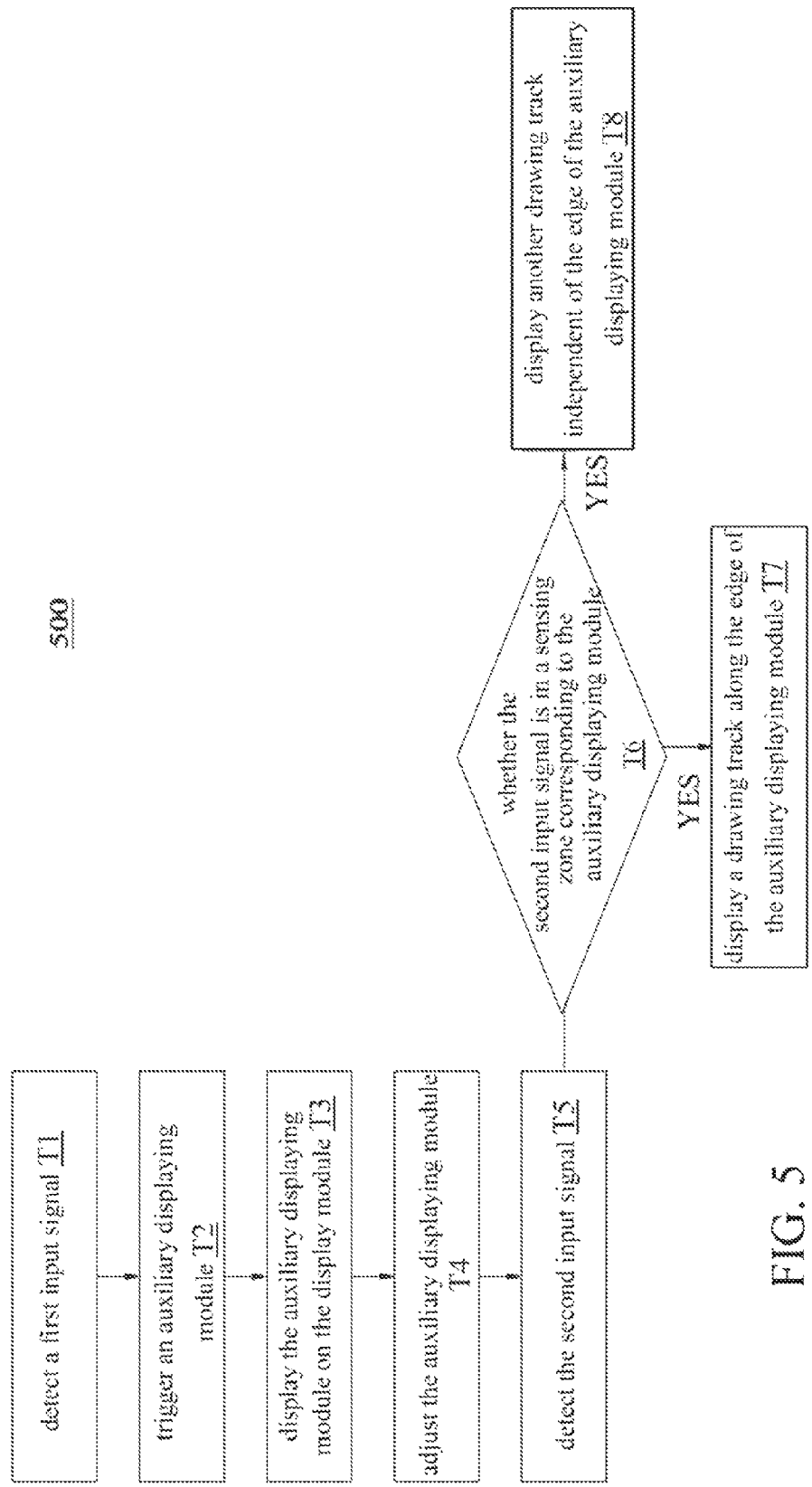
FIG. 5 is a flow chart of an operating method in a second embodiment.
Figure 6:
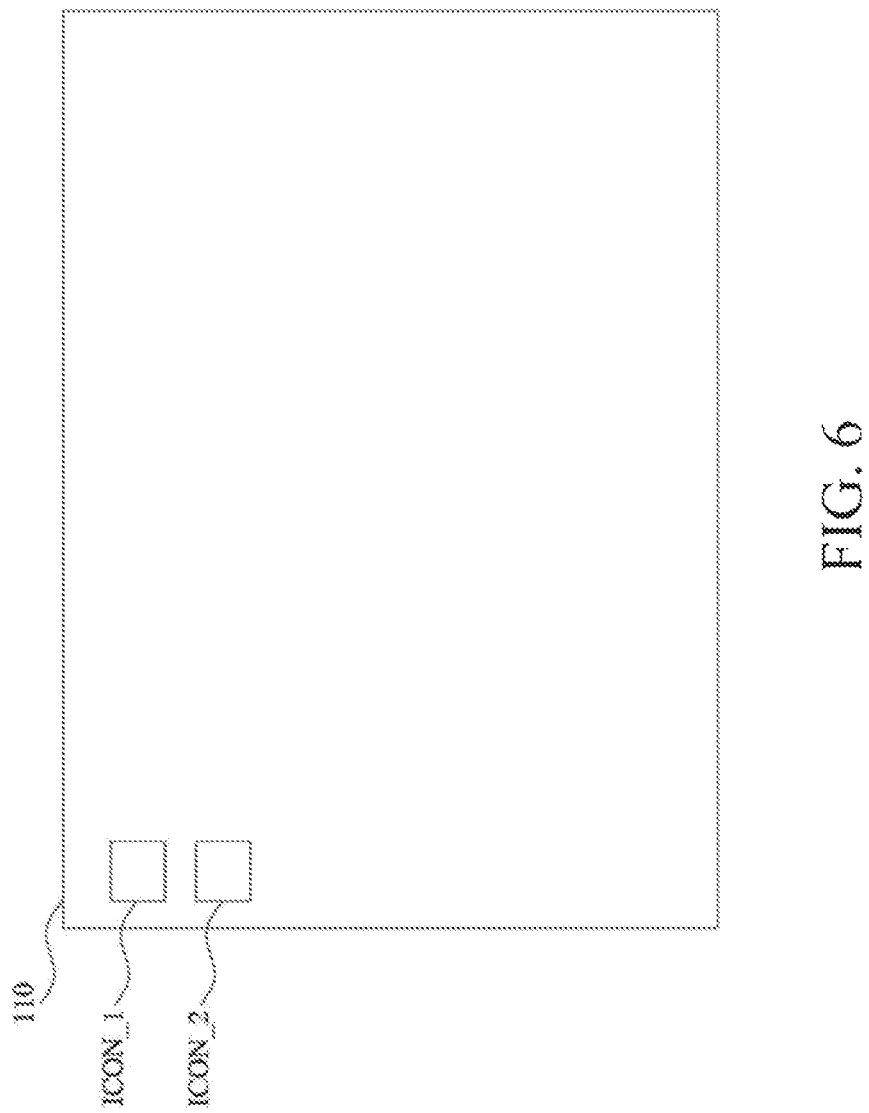
FIG. 6 is a schematic diagram of operations of the operating method in FIG. 2 in a second embodiment.
Figure 7:
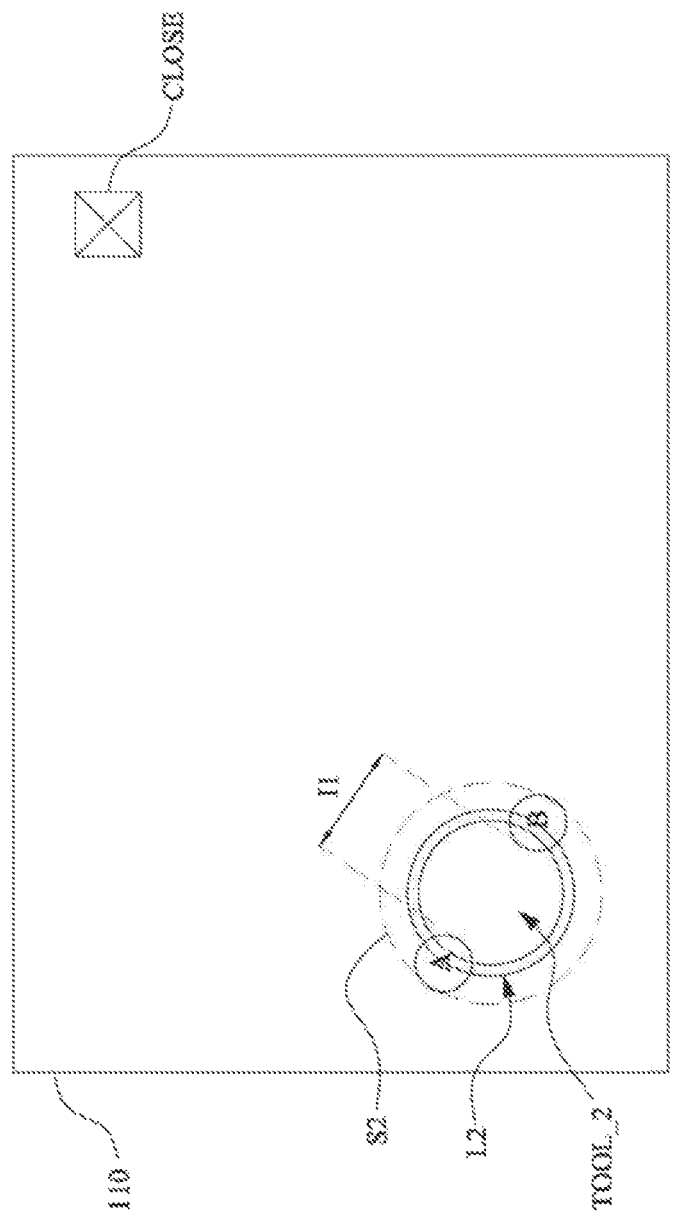
FIG. 7 is a schematic diagram of operations of the operating method in a second embodiment.

Please refer to FIG. 5, FIG. 6, and FIG. 7. FIG. 5 is a flow chart of an operating method 500 in a second embodiment. The operating method 500 is similar with the operating method 200 aforementioned, so same parts are omitted.

Similar to the operating method 200, the operating method 500 may be applied to the electronic device 100 in FIG. 1 or other similar devices. For a concise description purpose, the operating method 500 is described by applying it to the electronic device 100 in FIG. 1 according to an embodiment.

The operating method 500 may include following steps T1 to T8. The difference between the operating method 500 and the operating method 200 is that the operating method 500 is not limited to detect the second input signal only when the first input signal is continuous. Details are described by steps T1 to T8.

The step T1 may be referred to step S1 of the operating method 200, which is omitted herein.

In the step T2, the processing module 130 may determine whether the detected first input signal is a predetermined operation to trigger the auxiliary displaying module, and the processing module 130 operationally triggers the auxiliary displaying module according to the first input signal. Different from the step S2 of the operating method 200, a plurality of triggering icons may be predetermined to be displayed in the embodiment, such as the triggering icon ICON_1 (which may be used for triggering the virtual ruler TOOL_1 in the FIG. 3) and the triggering icon ICON_2 which may be used (for triggering the virtual protractor TOOL_2 in FIG. 4A, FIG. 4B). When the processing module 130 determines that the detected first input signal (such as the single point click) is at the triggering icon of the display module 110, the processing module 130 triggers the auxiliary displaying module.

Additionally, the predetermined operation for triggering the auxiliary displaying module may be a specific single point slide (such as an L-shaped slide or a U-shaped slide) or a multipoint slide, and the triggering icons aforementioned are not limited herein.

In the step T3, the processing module 130 may control the display module 110 to display the auxiliary displaying module and the auxiliary line of the auxiliary displaying module. Different from the step S3 of the operating method 200 in the embodiment the processing module 130 may control the display module 110 to display the auxiliary displaying module according to a predetermined display position, a predetermined display angle, or a predetermined display size.

In the step T4, the processing module 130 may detect a user input via the detecting module 120, and control the display module 110 to adjust the display size, the display angle and/or the display positions of the auxiliary displaying module and the auxiliary line displayed on the display module according to the user input. For example, the user input may be a single point slide dragging the auxiliary displaying module and the auxiliary line to adjust the display position of the auxiliary displaying module and the auxiliary line, and it adjusts the display angle and the display size of the auxiliary displaying module and the auxiliary line by a multipoint slide.

In step T5, the detecting module 120 may detect the second input signal via the display module 110. Different from the step S5 of the operating method 200, in the embodiment, the execution of the step T5 does not need to determine whether the first input signal continues. That is, even if the first input signal stops, the processing module 130 does not close the auxiliary displaying module, and the display module 110 also continues to display the auxiliary line of the auxiliary displaying module and the auxiliary displaying module.

In another aspect, in the embodiment, since whether to close the auxiliary displaying module is not determined according to whether the first input signal continues, the display module 110 may display a close icon of the auxiliary displaying module (such as the close icon CLOSE in FIG. 7). The detecting module 120 may detect a third user input via the display module 110. The processing module 130 may determine whether the third user input is on the close icon, and it closes the auxiliary displaying module and controls the display module 110 to stop displaying the auxiliary line of the auxiliary displaying module and the auxiliary displaying module when the third user input is on the close icon.

The steps T6 to T8 may be referred to the steps S8 to S10 in the operating method 200, and they are omitted hereinafter.

Please refer to FIG. 6. In a third operating mode, the user has a single point click on the triggering icon ICON_2. The processing module 130 determines that a touching point on the display module 110 is on the triggering icon ICON_2, so the processing module 130 triggers the virtual protractor TOOL_2. Then, referring to FIG. 7, the processing module 130 controls the display module 110 to display the auxiliary line L2 of the virtual protractor TOOL_2 and the virtual protractor TOOL_2 according to the predetermined display position and the predetermined display size. Furthermore, the display module 110 may display the virtual protractor TOOL_2 and the close icon CLOSE of the virtual protractor TOOL_2 at the same time, which allows the user to close the virtual protractor TOOL_2 by touching the close icon. On the other hand, after the virtual protractor TOOL_2 is displayed, the user may drag the virtual protractor TOOL_2 and the auxiliary line L2 by a single point slide or adjust the display size of the virtual protractor TOOL_2 and the auxiliary line L2 by a multipoint slide.

Next, when the virtual protractor TOOL_2 is enabled, the user may have a single point slide on the auxiliary line L2 to draw. The details of operations may refer to the examples of the operating method 200, which is omitted herein.

Figure 8:
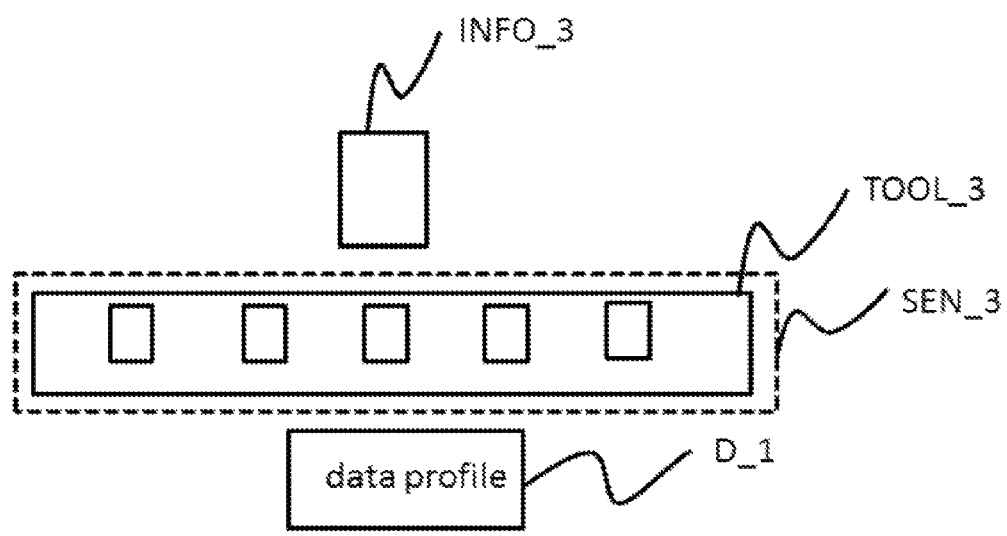
FIG. 8 is a schematic diagram of operations of the operating method in a third embodiment.

Please refer to FIG. 8. FIG. 8 is a schematic diagram of operations of the operating method in a third embodiment. In a third operation mode, the user touches the display module 110 by one finger. After determining, the processing module 130 triggers the menu list TOOL_3 according to the number of the sensing points (such as 1). Then, according to the sensing positions of the finger touching the display module 110 (such as the data file D_1), the processing module 130 determines the display position of the menu list TOOL_3. In the embodiment, the data file includes a lot of pictures, and the menu list TOOL_3 will display the zoomed out pictures. When the user's finger moves in the sensing zone SEN_3, the file information INFO_3 of each pictures will be displayed around the menu list TOOL_3, respectively. For example, in FIG. 8, when the second input signal is in the sensing zone of the selected picture (such as the middle picture) and is detected by the detecting module, the file information INFO_3 will pop out around the selected picture and displays the detail information of the selected picture.

A virtualized auxiliary displaying module may be realized by the settings aforementioned. Moreover, according to the embodiments, the user can get the information of the drawing track when the user draws using the auxiliary displaying module, and it greatly improves the convenience in drawing by the auxiliary displaying module.

Although the present invention has been described in considerable detail with reference to certain preferred embodiments thereof the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. An operating method adapted to an electronic device, wherein the electronic device includes a display module and a detecting module, the operating method comprising:
    detecting a first input signal in the display module by the detecting module;
    triggering an auxiliary displaying module according to the first input signal, and displaying the auxiliary displaying module on the display module, wherein the auxiliary displaying module includes an auxiliary line which defines an edge of the auxiliary displaying module;

detecting a second input signal by the detecting module;

determining whether the second input signal is in a sensing zone corresponding to the auxiliary displaying module, wherein the sensing zone encompasses the auxiliary line of the auxiliary displaying module;

displaying a first drawing track directly on the auxiliary line of the auxiliary displaying module according to the second input signal, and further displaying an auxiliary information about the first drawing track when the second input signal is in the sensing zone, wherein the auxiliary information is associated with the auxiliary displaying module and the second input signal, and wherein the first drawing track is a path directly on the auxiliary line of the auxiliary displaying module; and displaying a second drawing track independent of the auxiliary line of the auxiliary displaying module according to the second input signal when the second input signal is not in the sensing zone, wherein the second drawing track is a path of the second input signal sliding in the display module.

2. The operating method according to claim 1, further comprising:

displaying the auxiliary information along an edge of the first drawing track.

3. The operating method according to claim 2, wherein the auxiliary information is a length of the first drawing track when the auxiliary displaying module is a virtual ruler.

4. The operating method according to claim 2, wherein the auxiliary information is an angle of the first drawing track when the auxiliary displaying module is a virtual protractor.

5. The operating method according to claim 1, further comprising:

determining whether the first input signal continues; and closing and stopping displaying the auxiliary displaying module if the first input signal stops.

6. The operating method according to claim 1, wherein the step of detecting the second input signal further comprises:

detecting the second input signal if the first input signal lasts.

7. The operating method according to claim 1, wherein the step of triggering an auxiliary displaying module according to the first input signal comprises:

determining a number of sensing points of the first input signal; and determining a type of the auxiliary displaying module according to the number of the sensing points.

8. The operating method according to claim 1, wherein the step of displaying the auxiliary displaying module further comprises:

determining a display position of the auxiliary displaying module displaying on the display module according to a position of sensing points of the first input signal on the display module.

9. The operating method according to claim 1, wherein when the auxiliary displaying module is a virtual ruler, the step of displaying the auxiliary displaying module comprises:

determining a display angle of the auxiliary displaying module displaying on the display module according to a sensing position of a first sensing point and the sensing position of a second sensing point of the first input signal.

10. The operating method according to claim 1, wherein when the auxiliary displaying module is a virtual protractor, the step of displaying the auxiliary displaying module comprises:

determining a display size of the auxiliary displaying module displaying on the display module according to a distance between a sensing position of a first sensing point and the sensing position of a second sensing point of the first input signal.

11. The operating method according to claim 1, further comprising:

adjusting a display size, a display angle, or a display position of the, auxiliary displaying module displaying on the display module according to a displacement of the first input signal.

12. The operating method according to claim 1, wherein the auxiliary information is file information when the auxiliary displaying module is a menu list.

* * * * *